UNITED STATES PATENT OFFICE.

THOMAS L. PAGE AND JACOB APFEL, OF VICTORIA, TEXAS.

MEDICAL COMPOUND.

SPECIFICATION forming part of Letters Patent No. 481,815, dated August 30, 1892.

Application filed February 15, 1892. Serial No. 421,631. (No specimens.)

*To all whom it may concern:*

Be it known that we, THOMAS L. PAGE and JACOB APFEL, citizens of the United States, residing at Victoria, in the county of Victoria, State of Texas, have invented a new and Improved Medical Compound, of which the following is a specification.

This invention relates to medical compounds, and has for its object to provide a new and useful preparation for the treatment and cure of kidney and bladder affections.

The invention consists, essentially, in a medical compound composed of *Acacia constricta* or its equivalent *Acacia farnesiana* and *Flourensia cornua*, the two ingredients being prepared as an aqueous solution.

In carrying the invention into effect we boil water, preferably rain-water, and add thereto two parts of the *Acacia constricta* or *Acacia farnesiana* and one part of the *Flourensia cornua* in the proportions of about two ounces of the herbs to one gallon of water.

The *Acacia constricta* is a plant which grows in Mexico, and is also termed "Oho Sey," while the *Flourensia cornua* is a plant which grows in Texas, and is better known as "Wee Satche."

The mixture composes what may be termed "tea," and is very effectual in the treatment of kidney and bladder diseases.

The proper use of the medicine by adults is two wine-glassfuls taken internally twice a day and for children one table-spoonful twice a day.

Having thus described our invention, what we claim is—

A medical compound composed of an aqueous solution of *Acacia constricta* and *Flourensia cornua* prepared in about the proportions herein set forth.

In testimony whereof we have hereunto set our hands and affixed our seals in presence of two subscribing witnesses.

THOS. L. PAGE. [L. S.]
JACOB APFEL. [L. S.]

Witnesses:
E. A. PINNERT,
H. HALFIN.